Figure 1:
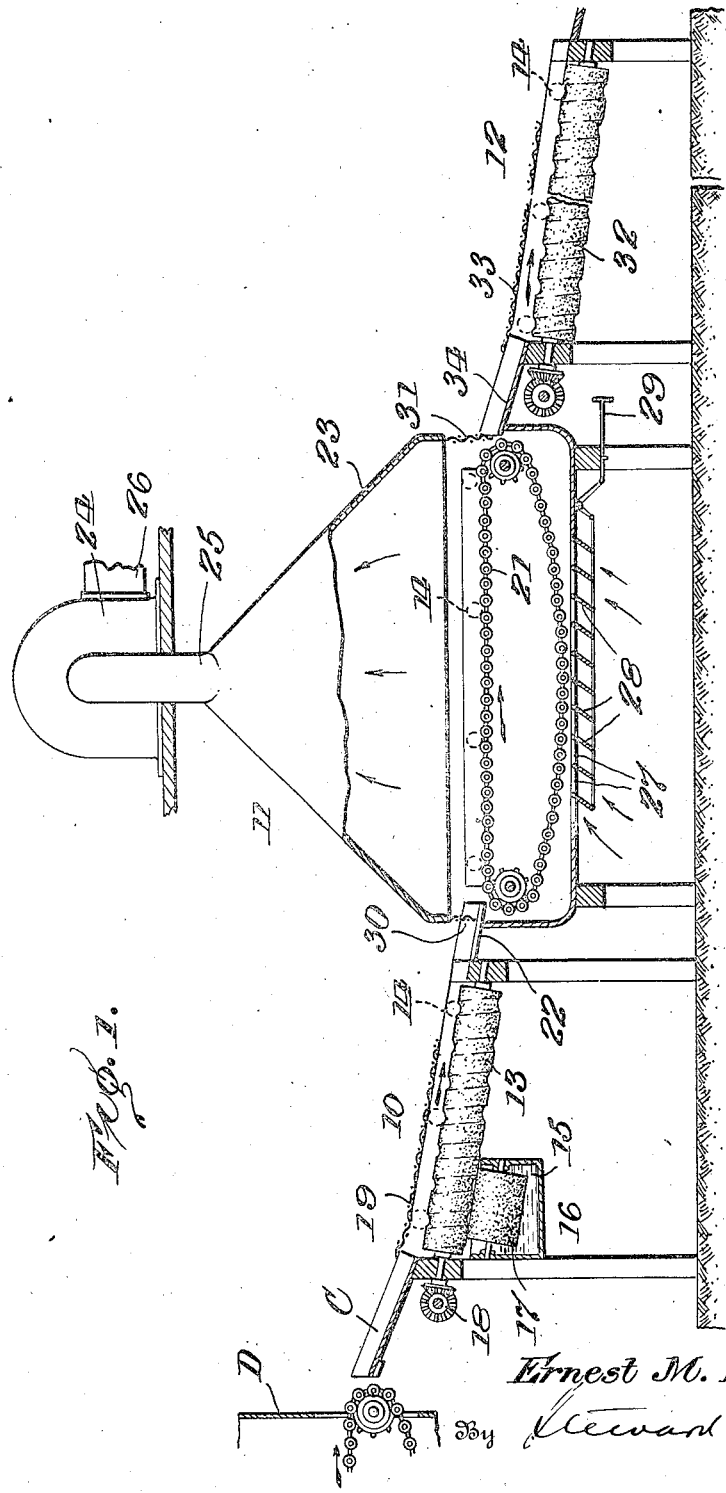

May 18, 1926.

E. M. BROGDEN

PRESERVATION OF FRESH FRUIT

Filed March 8, 1922

1,585,370

2 Sheets-Sheet 1

Inventor

Ernest M. Brogden,
By Stewart & McKay
his Attorneys

May 18, 1926.

E. M. BROGDEN 1,585,370

PRESERVATION OF FRESH FRUIT

Filed March 8, 1922

2 Sheets-Sheet 2

Inventor

Ernest M. Brogden,

By Steward & McKay his Attorneys.

Patented May 18, 1926.

1,585,370

UNITED STATES PATENT OFFICE.

ERNEST M. BROGDEN, OF WINTER HAVEN, FLORIDA, ASSIGNOR, BY MESNE ASSIGNMENTS, TO BROGDEX COMPANY, OF WINTER HAVEN, FLORIDA, A CORPORATION OF FLORIDA.

PRESERVATION OF FRESH FRUIT.

Application filed March 8, 1922. Serial No. 542,141.

This invention relates to preservation of fresh fruit; and in particular to the treatment of grapefruit, oranges, lemons, apples, etc., with a coating composition comprising a waxy material and a liquid vehicle consisting principally or wholly of kerosene, so compounded as to be spreadable over the surface of the fruit to produce a film-like waxy coating that effectively prevents evaporation of the fruit juices and infection of the fruit by mold or rot organisms, and maintains the fruit in its original firm, plump, and fresh condition for relatively long periods of time.

In prior copending applications I have disclosed and claimed compositions and methods for preserving fresh citrus and other fruits, characterized in general by the employment of a waxy material such as paraffin, intimately commixed with a solvent vehicle, such as gasoline, of a fairly high degree of volatility. I have found that, under proper conditions, it is possible and frequently advantageous to employ a less volatile vehicle, specifically kerosene, to take the place of the gasoline either wholly or in part. The term kerosene is herein used to include any of the mineral oil distillates falling within the cut or fraction to which the name is commonly given. It is to be understood also that the term fruit as employed herein comprehends also other vegetable products such as cucumbers, tomatoes, cantaloupe, or the like, which can advantageously be treated for preservation in accordance with the present invention.

For the sake of a concrete illustrative example from which the principles of the invention can be fully understood, reference will be made hereinafter more particularly to the preservative treatment of citrus fruits, but it is not to be inferred that the invention is limited thereto.

In applying the principles of the invention to treating citrus fruit, the best procedure now known to me is first to spread a thin coating of the paraffin-kerosene mixture all over the surface of the fruit, then to remove a substantial portion of the kerosene by passing the fruit through suitable evaporating or drying apparatus, and finally to give the fruit a thorough rubbing by means of appropriate buffing or brushing apparatus to complete the formation of a film-like waxy coating of uniform thickness and to impart a polish to the fruit. The coating thus obtained is found to possess especially desirable characteristics both as regards effective preservation of the fruit and as enabling a good polish to be obtained. Apparently the less volatile constituents of the kerosene are retained to some extent by the waxy base, but not to such an extent as to injure the fruit or to be objectionable otherwise; and these less volatile constituents seem to increase the toughness and adherence of the waxy coating, and also to provide a good polish ingredient.

Various forms of apparatus may be employed in treating fruit in accordance with the invention. One suitable form is shown more or less diagrammatically in the accompanying drawings, in which—

Figure 2:
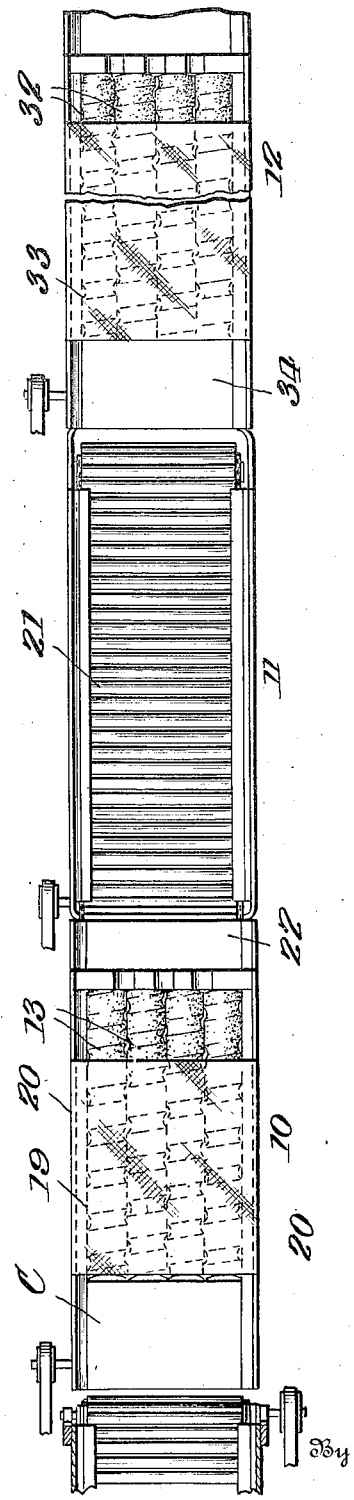

Fig. 1 is a side elevation of apparatus embodying the principles of the invention; and Fig. 2 is a plan view of the same, parts being broken away or removed to disclose underlying mechanism.

In the apparatus here shown, composition-applying means are indicated generally at 10; evaporator or drier means at 11, and polisher means at 12.

The unit 10 for applying the composition comprises a plurality of parallel inclined rubbing rolls 13 cooperating in pairs to provide runways down which fruit, such as oranges 14 may pass, said rolls being supplied with the coating composition 15 from supplying tank or reservoir 16, through the agency of an applying or transfer roll 17 journaled in the walls of the tank and frictionally driven by contact with one or more of the rolls 13. These rolls 13, which may be termed wiper rolls, are in turn driven through suitable gearing 18, said rolls all rotating in the same direction. Except for the provision of the described means for supplying coating material to the rolls, the unit 10 may be substantially the same in construction as a fruit-polisher of the well known Stebler-Parker type, with the horsehair brushes spirally grooved to facilitate movement of the fruit toward the discharge end of the runways. A flexible covering or blanket 19 of textile material, secured at its opposite edges 20—20 to the polisher frame, is advantageously provided for a purpose to be explained later.

The drier unit 11 is desirably of the roller belt type, as before stated. As here shown it comprises the roller belt or conveyor element 21 of usual construction, to which fruit is discharged from unit 10 over a chute board 22, the roller belt being suitably driven so that its upper pass travels toward the right in the drawing. The conveyor is enclosed in a housing 23; and in order to expedite evaporation of the solvent from the coated fruit going through the drier, means are provided for passing a current of air in contact with the fruit, such means consisting for example, of a fan 24, drawing air and vapors out of the housing through stack 25 and discharging them through duct 26 to any desired point. A similar housing, with or without the fan, may be provided for the unit 10 where deemed desirable to prevent escape of vapors of kerosene; but this is not essential and is not necessary to illustrate here. The bottom of the housing 23 may be provided, if desired, with openings controlled by shutters 28 which are adjustable by an operating lever 29 to vary the effective area of said openings and thus to govern in large measure the volume of air moved transversely of the roller-belt 21 by the fan. The entrance and exit openings of the drier unit may be guarded by flexible boots or curtains 30 and 31, respectively.

The polisher unit 12 here illustrated may be of the standard Stebler-Parker type, comprising a plurality of spirally grooved horse-hair bristle brushing rolls 32 of the same general construction and arrangement as wiper rolls 13 already described. The polisher rolls 32 should ordinarily be considerably longer than the wiper rolls, however, and should be driven to revolve at greater speed.

In practice, four to six feet is a good length for the wiper rolls, and eight to ten feet or more for the polisher rolls; while the wiper rolls may advantageously be rotated rather slowly, say 50 to 75 R. P. M., and the polisher rolls at 150 R. P. M. or more, these figures being understood as merely typical and in no sense restrictive. The polisher rolls may be provided with a cover or blanket 33 similar to 19; and fruit is delivered to said rolls from the drier or evaporator unit over chute board 34.

In employing the above described apparatus for carrying out the process of the invention, the fruit, such as oranges, which under the usual practice will have previously been washed and dried in the usual manner, is discharged from a drier of the roller belt type indicated conventionally at D and rolls down over the chute board C to the upper end of the runways provided by the cooperating pairs of wiper rolls 13. Here the fruit is thoroughly covered with the liquid or semi-liquid coating composition constantly supplied to the wiping rolls by the applying or transferring roll 17.

The rolls 13 are revolved at a comparatively low speed as above pointed out, and their function is to thoroughly rub the coating composition all over the surface of every fruit as the fruit passes down the runways. In passing down the runways the fruit is under the blanket 19 which rests upon the fruit and exercises a retarding or braking action that is effective to constantly change the rotation axis of the fruit and thus ensure its being rubbed on all sides by the wiper rolls and thoroughly coated with the paraffin-kerosene composition. The blanket itself also assists in this rubbing and wiping treatment. By the time the fruit has reached the lower ends of the runways, it is thoroughly covered with a thin coating of the fluid composition which still holds a very considerable part of the solvent. The fruit is now discharged from the unit 10, and rolling down over the chute board 22, pushes its way under the boot or curtain 30 and comes to rest on the roller belt 21 of the drier or evaporator unit 11. The fruit is carried slowly through this evaporator by the roller belt conveyor and is meanwhile exposed to a current of air induced by the suction fan 24, and warmed if desired. Since the rollers of the roller belt turn about their own longitudinal axes as the belt moves forward and fruit carried thereby is constantly turned over and over and in that way exposed on all sides to the full evaporating effect of the air current. Consequently the kerosene is volatilized to a considerable extent and carried away, leaving a congealed or solid film-like coating of paraffin on the fruit. The roller belt conveyor discharges the fruit under boot or curtain 31, whereupon it rolls down the chute board 34 and enters the upper ends of the runways between the polisher rolls 32 of the polisher unit 12. These rolls most desirably rotate at a considerably higher rate of speed than the wiper rolls 13, as previously pointed out; and as the paraffin coating on the fruit is now comparatively solid and sufficiently free from solvent to prevent its being sticky or adhesive, the soft polishing surfaces of the rolls 32 do not become loaded with paraffin to a substantial extent and they are thus enabled to exercise their intended function of imparting a good polish to the coated fruit. The use of the blanket 33, which assists in varying the axis of rotation of the fruit as it passes down the runways, is optional but desirable in favoring thorough polishing of the fruit over its entire surface. When it reaches the lower end of the polisher rolls 32, the fruit is then discharged to the grading belt (not shown) and is thereafter graded and sized in the manner well understood in the art and unnecessary to describe here.

The relative proportions of waxy material and kerosene in the coating mixture may vary within reasonably wide limits. A creamy composition prepared by mixing 30 parts of commercial paraffin and 70 parts of kerosene, by volume, has given excellent results in treating California oranges; but the proportion of paraffin may be greatly increased, especially if the mixture be homogenized or emulsified by relatively high speed agitation in suitable emulsifier apparatus. Such treatment ensures that the composition be reasonably fluid and readily spreadable in a thin film, even though the proportion of paraffin be high. In practice, the mixture may contain as little as one volume of paraffin to three of kerosene, or as much as three volumes of paraffin to one of kerosene. These proportions are mentioned to indicate a typical working range and are not intended as restrictive.

In preparing the coating composition, a convenient procedure is to thoroughly liquefy the paraffin by heating and then adding the desired amount of kerosene thereto while stirring. After the mixture has cooled, it may advantageously be homogenized with the aid of a fairly high speed emulsifier or homogenizer.

The paraffin-kerosene mixture may also advantageously contain a quantity of finely divided solid matter of harmless character that serves, among other things, to facilitate evaporation of the solvent to the extent desired. Ordinary cooking starch is an ideal substance for this purpose, and it has the additional effect of improving the polish obtained on the fruit. The dry starch may be added after the paraffin wax and kerosene have been mixed and before treatment in the emulsifier. Paraffin oil may also sometimes be used to advantage in small proportions in the mixture where starch is employed. The amount of starch used may vary depending upon the consistency and other properties desired. Typical mixtures are as follows, all parts being by volume:

(1) 1 part kerosene, ½ part paraffin wax, 1 to 2 parts starch.

(2) 1 part kerosene, ¼ part paraffin wax, 2 parts starch.

(3) 1 part kerosene, ¼ part paraffin wax, ¼ part paraffin oil, 2¼ parts starch.

(4) 1 part kerosene, ¼ part paraffin oil, 2½ parts starch.

(5) 1 part kerosene, 1 part paraffin wax, 1 part starch.

The foregoing mixtures, when properly prepared and homogenized or emulsified, are of light creamy to buttery consistencies at ordinary summer temperature and spread easily on fruit to provide a film coating.

In the foregoing specific examples, it is permissible to include also a harmless coloring agent or dye to mask the whiteness of the starch constituent and thus to render the presence of the coating on the fruit unnoticeable to the unpracticed eye. As an example of such a harmless coloring agent, useful where fruits such as oranges or grapefruit are to be treated, may be mentioned the vegetable dye known as annatto (arnotto), which is often used, as is well known, to color butter for instance. Where paraffin oil is included in the composition, there is less necessity for adding a coloring agent, although it may be used in that case also if deemed desirable.

The paraffin oil mentioned in examples (3) and (4) above is the mineral oil obtainable on the market under that name. In its place may be used other oils that are heavier than kerosene and are of the general character of light lubricating oils.

It is to be understood that, while the typical coating compositions hereinabove specifically described include only kerosene as the liquid vehicle, the presence of other solvents also in the mixture, such as gasoline for example, is not precluded.

It is to be noted that in mixture (4) above, no paraffin wax is used, and the proportion of starch used is greater than in mixture (3). A mixture like (4) offers practical advantages in some cases for treating certain fruits. The novel compositions of matter herein disclosed are claimed in a divisional application Serial No. 731,207, filed August 9, 1924.

What I claim is:

1. The process of treating fresh fruit which comprises spreading over the surface thereof a thin coating of waxy material in mixture with a liquid vehicle consisting principally of kerosene.

2. The process of treating fresh fruit which comprises spreading over the surface thereof a thin coating of a mixture comprising paraffin and kerosene.

3. The process of treating fresh fruit which comprises spreading over the surface thereof a thin coating of an emulsified mixture of paraffin and kerosene.

4. The process of treating fresh fruit which comprises spreading over the surface thereof a thin coating of a mixture comprising paraffin and kerosene, the paraffin constituting from about 25 per cent to 75 per cent of the mixture, by volume.

5. The process of treating fresh fruit which comprises spreading over the surface thereof a thin coating of a mixture comprising waxy material and a liquid which consists principally of kerosene, evaporating off at least a part of the kerosene and thoroughly rubbing the fruit.

6. The process of treating fresh fruit which comprises rubbing on the fruit a spreadable mixture comprising waxy material, finely divided solid matter, and kerosene, to provide a preservative film coating on said fruit.

7. The process of treating fresh fruit which comprises applying to the fruit a thin coating of a mixture comprising paraffin, starch, and kerosene, and rubbing the fruit to spread the composition in a film coating thereover.

In testimony whereof I hereunto affix my signature.

ERNEST M. BROGDEN.